(12) United States Patent
Kinnear, Jr. et al.

(10) Patent No.: US 7,757,000 B1
(45) Date of Patent: Jul. 13, 2010

(54) COMPUTED CLIENT IDENTIFIER IN DHCP

(75) Inventors: Kenneth E. Kinnear, Jr., Boxborough, MA (US); Joshua B. Littlefield, Wellesley, MA (US); James Timothy Brown, Wayland, MA (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 11/638,744

(22) Filed: Dec. 14, 2006

(51) Int. Cl.
*G06F 15/16* (2006.01)
*G06F 12/00* (2006.01)

(52) U.S. Cl. ...................... 709/245; 709/230
(58) Field of Classification Search ................ 709/230, 709/245, 217–218, 250
See application file for complete search history.

(56) References Cited

U.S. PATENT DOCUMENTS

| | | | |
|---|---|---|---|
| 6,212,563 B1 | 4/2001 | Beser | |
| 7,502,841 B2 * | 3/2009 | Small et al. | 709/223 |
| 7,574,208 B2 * | 8/2009 | Hanson et al. | 455/435.1 |
| 7,647,417 B1 * | 1/2010 | Taneja | 709/230 |
| 2002/0009078 A1 * | 1/2002 | Wilson et al. | 370/389 |
| 2003/0101243 A1 | 5/2003 | Donahue et al. | |
| 2004/0153550 A1 * | 8/2004 | Payeur | 709/228 |
| 2005/0021766 A1 * | 1/2005 | McKeowen et al. | 709/228 |
| 2005/0044265 A1 * | 2/2005 | Vinel et al. | 709/238 |
| 2005/0163118 A1 | 7/2005 | Steindl | |
| 2006/0009213 A1 * | 1/2006 | Sturniolo et al. | 455/426.1 |
| 2007/0005796 A1 | 1/2007 | Reynders | |

OTHER PUBLICATIONS

Droms, R., "RFC 2131—Dynamic Host Configuration Protocol," retrieved from internet Jul. 27, 2007 (www.faqs.org/rfcs/rfc2131.html), Mar. 1997, Bucknell University, 32 pages.
Patrick, M., "RFC 3046—DHCP Relay Agent Information Option," retrieved from internet Jul. 27, 2007 (www.faqs.org/rfcs/rfc3046.html), Jan. 2001, Motorola BCS, 10 pages.
"Cisco IOS Software Releases 12.2 T: DHCP Option 82 Support for Routed Bridge Encapsulation," retrieved from internet Nov. 1, 2006, (www.cisco.com/en/US/products/sw/iosswrel/ps1839/products_white_paper09186a0080087ad8.shtml), 6 pages.
"EtherNet/IP: Recommended Operation for Switches Running Relay Agent and Option 82," Sep. 7, 2004, 7 pages, Version 1.0, EtherNet/IP Implementor Workshops.

* cited by examiner

*Primary Examiner*—Zarni Maung
(74) *Attorney, Agent, or Firm*—BainwoodHuang

(57) ABSTRACT

A method performed by a DHCP server. The method involves receiving a transformation instruction from a user or other command source. The method further involves in response to receiving a request from a client for a network address, applying the transformation instruction to the client request to generate a client identity pattern; and assigning a network address from a pool of network addresses to the client based on the client identity pattern. Apparatus for use in practicing the method are also claimed.

21 Claims, 5 Drawing Sheets

COMPUTED CLIENT IDENTIFIER IN DHCP

BACKGROUND

The Dynamic Host Configuration Protocol (DHCP) allows hosts on a network to obtain network addresses and other network configuration information from a DHCP server. A detailed description of conventional DHCP is provided in a document entitled "RFC 2131 DYNAMIC HOST CONFIGURATION PROTOCOL," by R. Droms, March 1997, the teachings of which are hereby incorporated by reference in their entirety. When a host is not directly connected to the DHCP server, communications between the host and the DHCP server are forwarded by a relay agent. The relay agent may add additional information into the DHCP packets in the form of Option 82 data. A detailed description of DHCP relay agents and Option 82 is provided in a document entitled "RFC 3046 DHCP RELAY AGENT INFORMATION OPTION," by M. Patrick, January 2001, the teachings of which are hereby incorporated by reference in their entirety.

Implementations of DHCP typically allocate network addresses (for example, in an Internet Protocol network, an IP address) to the clients based on the hardware addresses (for example, in an Ethernet network, the MAC addresses) of the clients. In a manufacturing environment, pieces of machinery on a factory floor may each connect to a network, each machine having a MAC address. The machines may receive their IP addresses through DHCP. However, if a piece of machinery fails and must be swapped out and replaced with a new virtually identical piece (but having a different MAC address), conventional DHCP will likely assign the new piece a different IP address than that assigned to the predecessor piece since the new piece has a different MAC address. This can interrupt the proper flow of the factory floor. For example, if the machines are controlled by an IP-based manufacturing control system, the swapped-out machine will no longer appear to be operational. In one conventional system, an extension to the DHCP server is configured to intercept an incoming DHCP Discover packet and rewrite the hardware address field of the packet with the hardware address and the port of the switch to which the machine is connected. This interception and rewrite are performed by an extension before the packet is received by the DHCP server program. This technique fools the DHCP server into thinking that the new piece is actually the predecessor piece. This technique allows the DHCP server to assign the same network address to swapped-out machines. The extension then rewrites the hardware address field of the outgoing DHCP packet with the original hardware address so that the packet can be directed to the proper host.

BRIEF DESCRIPTION OF THE DRAWINGS

Objects, features and advantages of particular embodiments of the invention will be apparent from the following description, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Certain embodiments provide improved methods for assigning a network address to a device on a network. Other embodiments are directed at apparatus for use with these methods.

The above-described prior art approach is deficient. In particular, the DHCP server extension is sub-optimal because it requires that fields in DHCP Discover packets be overwritten. That approach may allow some information to be lost. In addition, that approach is not ideal because it requires the DHCP server to always assign network addresses based on the hardware address and port number of the switch to which the host is connected. However, that data is only made available by a relay agent operating on the switch, and the relay agent on the switch may not be configured to provide that information. In addition, there may be circumstances under which it would be more advantageous to use other portions of the DHCP Discover packet to uniquely identify the host.

Therefore, certain embodiments of the invention provide an enhanced DHCP server. The enhanced DHCP server accepts a user-input transformation instruction. This instruction allows the enhanced DHCP server to compute a client identifier based on an incoming DHCP Discover packet and assign a network address based on the computed client identifier.

Description of Example Embodiments

Figure 1:
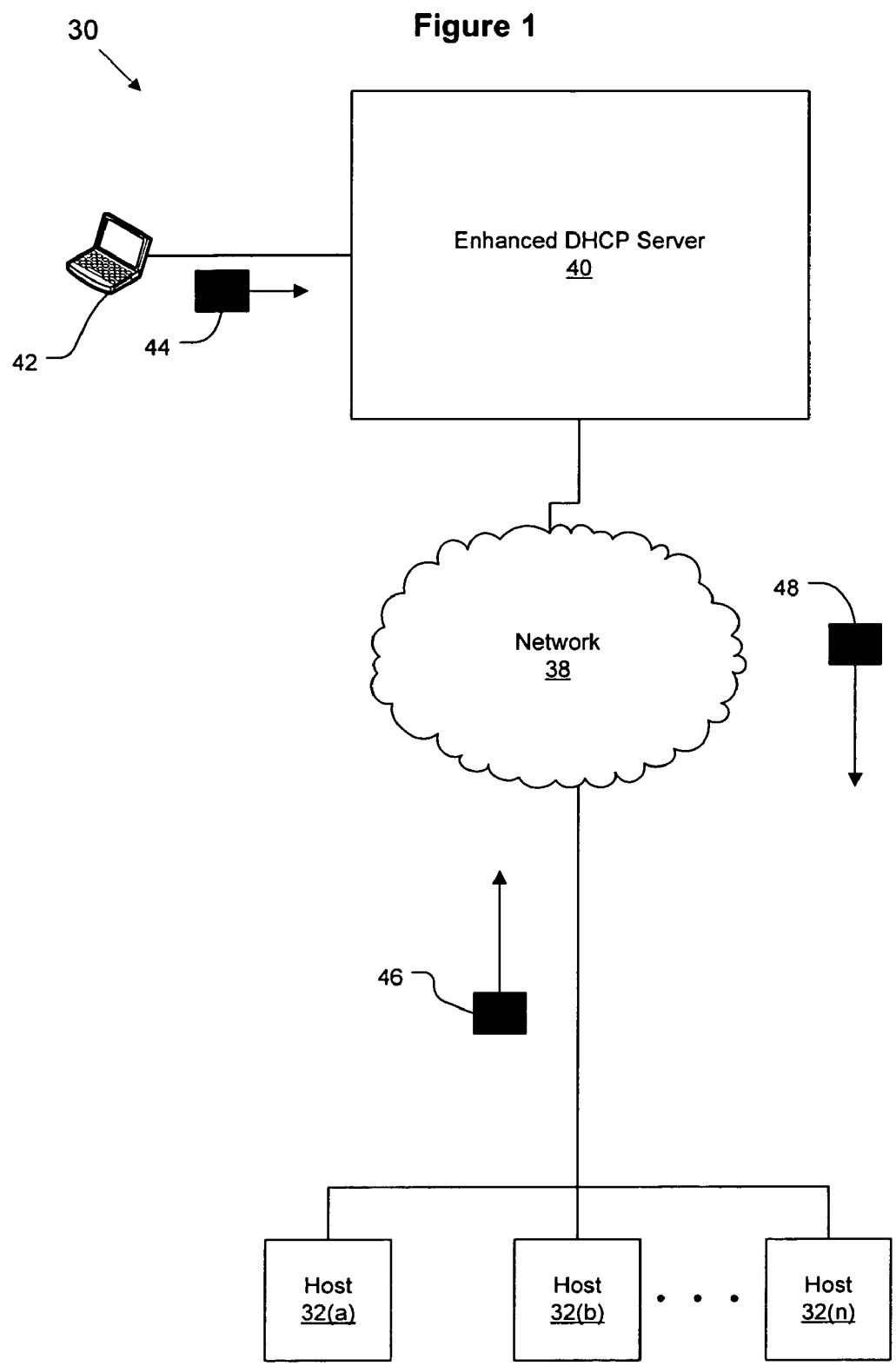
FIG. 1 illustrates an example system for use by various embodiments.

FIG. 1 depicts an example system 30 for use by various embodiments. The system includes multiple host computers 32(a), 32(b), . . . 32(n) (generally, hosts 32), attached to a network 38. The system 30 also includes an enhanced DHCP server 40, also connected to the network 38. The enhanced DHCP server 40 also connects to an interface device 42 (for example, a display, keyboard, and mouse; an input-output terminal; a laptop, etc.) to allow users to interface with the enhanced DHCP server 40.

The interface device 42 is used to program the enhanced DHCP server 40 with a transformation instruction 44. When a host 32 sends a DHCP Discover packet 46 to the enhanced DHCP server 40, the enhanced DHCP server 40 applies the transformation instruction 44 to the DHCP Discover packet 46 in order to identify a client represented by the host 32. The enhanced DHCP server 40 assigns an IP address to the host 32 with reference to the client identification, sending a DHCP Offer packet 48 back to the host 32.

Figure 2:
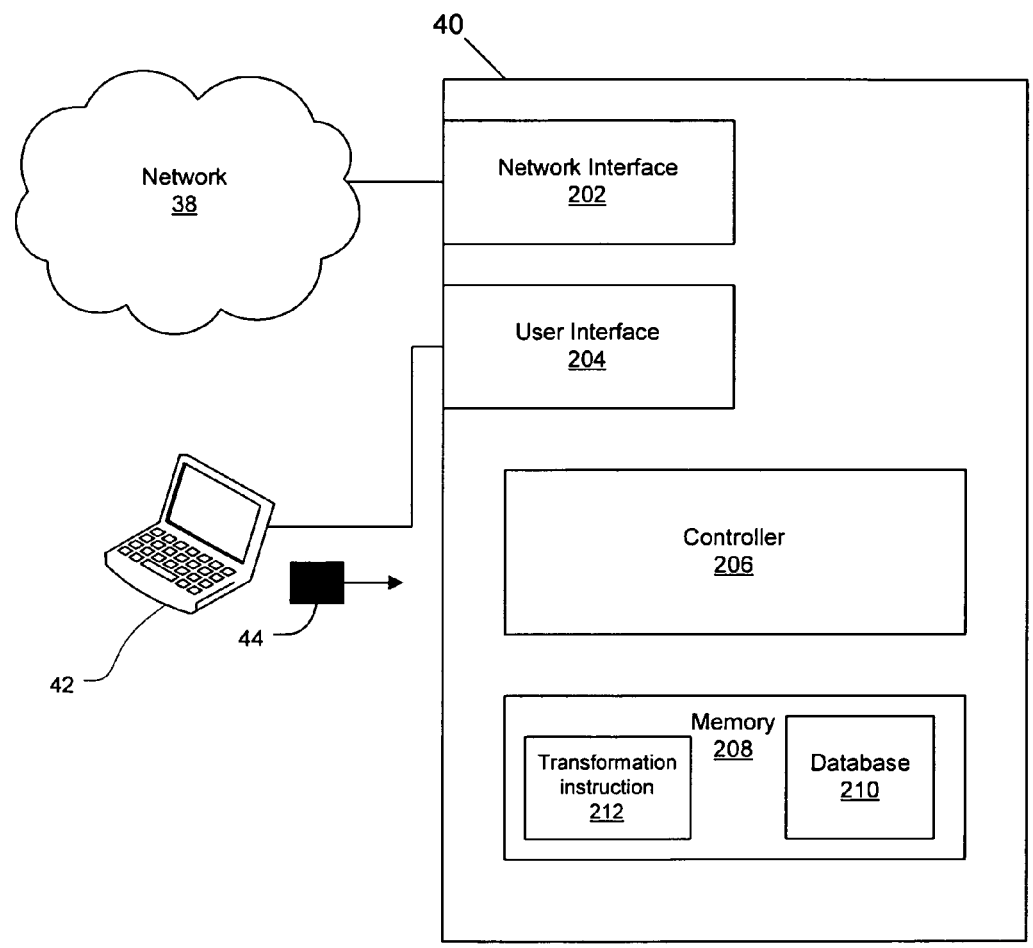
FIG. 2 illustrates an example apparatus for use by various embodiments.

Further details of the enhanced DHCP server 40 are provided in FIG. 2. The enhanced DHCP server 40 contains a network interface 202, a user interface 204, a controller 206, and memory 208. The network interface 202 connects to the network 38. The user interface 204 connects to the interface device 42. The memory 208 contains a database 210 for storing DHCP information. The memory 208 also stores a user-input transformation instruction 44 (stored as 212). Further details with respect to the controller 206 are elucidated in FIG. 3.

The network interface 202 allows the enhanced DHCP server 40 to communicate with the network. The user interface 204 allows the enhanced DHCP server to communicate with a user in order to receive the transformation instruction 44. The controller receives the transformation instruction 44, and stores it in memory as 212. The controller also maintains a DHCP database 210 within the memory, and communicates with other computers on the network 38 (through the network interface 202).

Figure 3:
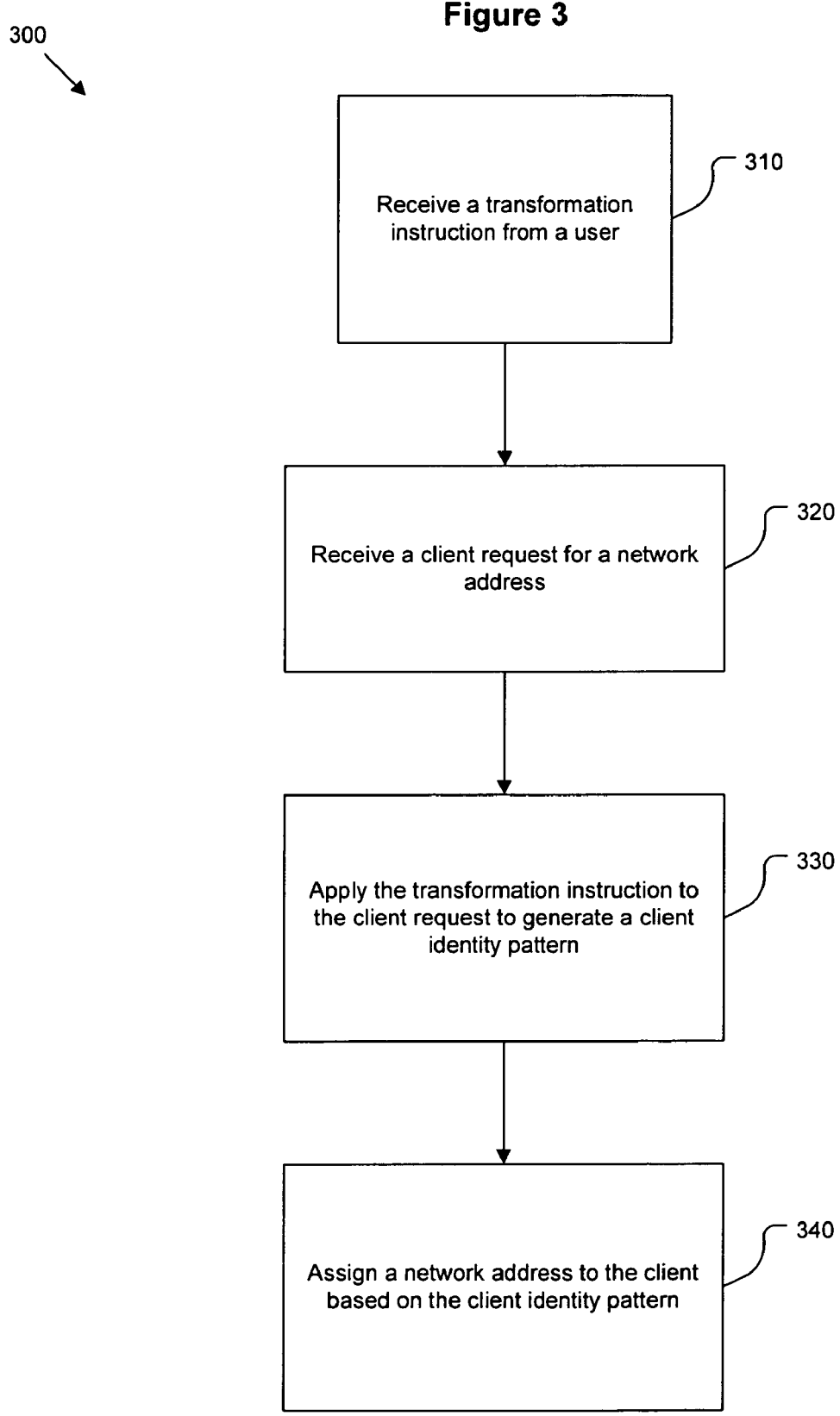
FIG. 3 illustrates a method of an example embodiment.

The enhanced DHCP server 40 may perform a method 300 as illustrated in FIG. 3. A user may input a transformation instruction 44 (see FIG. 1) into the user interface by means of the interface device 42. (Step 310). The user interface 204 may provide, for example, a graphical interface to the user, allowing the transformation instruction 44 to be entered by means of selecting graphical elements on a screen. Alternatively, the user interface 204 may merely accept a string of text entered from a keyboard. Once this transformation instruction 44 has been entered, the enhanced DHCP server is able to accept DHCP requests from client hosts 32 that it manages. (Step 320). Typically, a host 32 having its IP address managed by the enhanced DHCP server 40, if the host is not aware of its IP address, sends a DHCP Discover packet 46 to the enhanced DHCP server 40. Upon receiving such a packet, the controller 206 applies the transformation instruction 44 to the received DHCP Discover packet 46, outputting a client identity pattern 450 (see FIG. 4), by which the client may be identified. (Step 330). In the ordinary case, the client is a particular host 32. However, in some instances, two hosts 32 might properly be regarded as the same client, although never simultaneously. The controller 206 uses the computed client identity pattern 450 as a key into the DHCP database 210 to assign an IP address to the client. (Step 340). If the database 210 notes that the client identity pattern 450 is associated with a client assigned a current lease to an IP address, the controller 206 notifies the host 32 of the IP address that it has already been assigned. If the database 210 notes that the client identity pattern 450 is associated with a client which previously held a now-expired lease to an IP address, the controller 206 attempts to assign the same IP address to the host 32, otherwise assigning it another IP address. If the database 210 does not note any previous IP address associated with the particular client identity pattern, the controller may assign any IP address to the host 32. In any event, the controller creates a DHCP Offer packet 48 (see FIG. 1) containing the assigned IP address, and sends the DHCP Offer packet 48 to the host 32 over the network interface 202. Additional steps to actually complete the assignment of the IP address are well-known in the art, and are not provided. Further details of the assignment procedure may be found in RFC 2131, previously incorporated by reference into this document.

Figure 4:
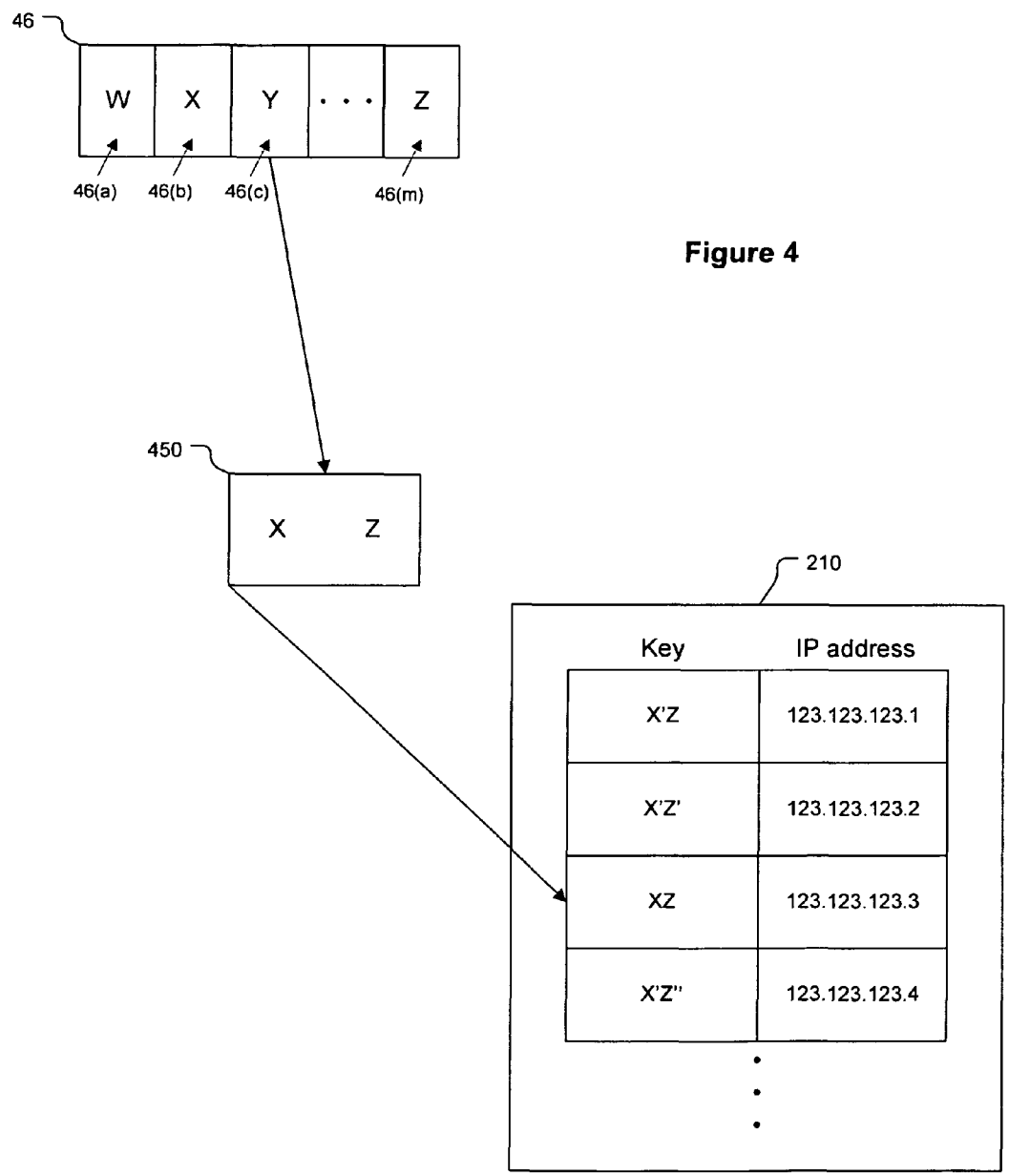
FIG. 4 illustrates an example application of a transformation instruction to a client request.

Additional details with respect to the transformation instruction and its application are provided in FIG. 4. The DHCP Discover packet 46 contains several fields 46(a), 46(b), 46(c), . . . 46(m), each field containing data W, X, Y, . . . Z. The controller 206 applies the stored transformation instruction 212 to the DHCP Discover packet 46 to produce the client identity pattern 450. The transformation does not actually alter the DHCP Discover packet 46. In the embodiment depicted in FIG. 4, the transformation instruction 212 is an instruction to select particular fields and concatenate them together. In this case, fields 46(b) and 46(m) are selected and concatenated together to form the client identity pattern 450 with data XZ. This client identity pattern 450 keys into the DHCP database 210. In this example, key XZ associates with IP address 123.123.123.3, so host 32 is assigned 123.123.123.3 as its IP address.

It should be understood that other kinds of transformation instructions 212 are possible. The transformation instruction 212 may be any sort of executable expression that operates on a packet. For example, the transformation instruction 212 may be an instruction to take only some data from some fields. As another example it may be an instruction to multiply the binary values of several fields together, and raise that value to the power of the binary value of another field. The transformation instruction 212 may be any instruction that the user wishes. Nevertheless, if the client identity pattern is to have any real meaning, the transformation instruction 212 should be carefully selected so as to always uniquely identify a particular client. The definition of what constitutes a client may vary, however. Further details of client definition are provided below.

Figure 5:
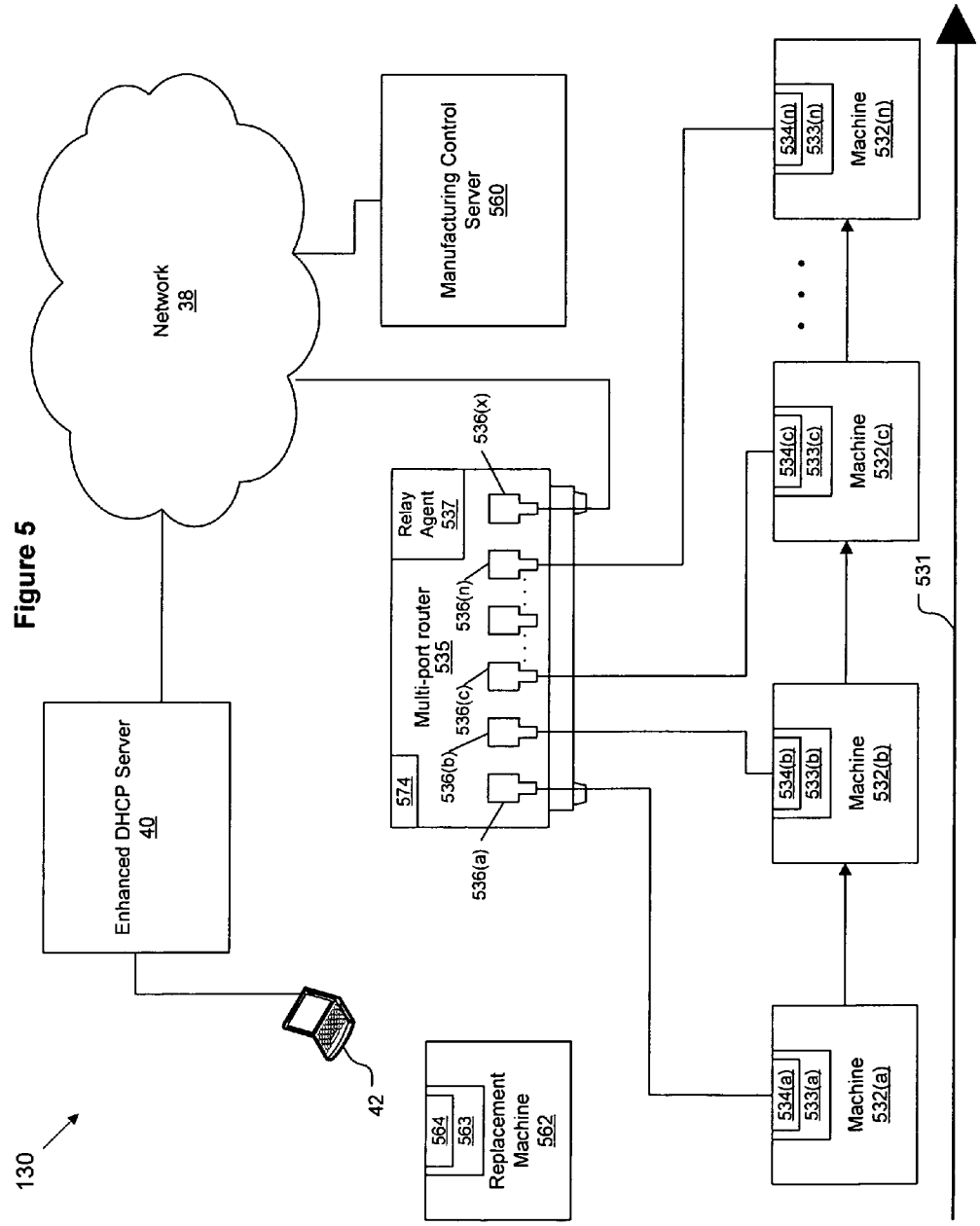
FIG. 5 illustrates an example system for use by particular embodiments.

In one embodiment, as depicted in FIG. 5, a system 530 includes an assembly line 531 on a factory-floor. The assembly line 531 includes multiple machines 532(a), 532(b), 532(c), . . . 532(n) (generally machines 532). These machine function similarly to the hosts 32 of FIG. 1. In one embodiment, the output of machine 532(a) is the input of machine 532(b), and the output of machine 532(b) is the input of machine 532(c), etc. Each machine contains a network interface 533 (depicted as network interfaces 533(a), 533(b), 533(c), . . . 533(n)). The network interfaces 533 each contain a unique physical network address 534 (depicted as physical network addresses 534(a), 534(b), 534(c), . . . 534(n)), such as, for example, a MAC address. The network interfaces each connect to a port 536 (depicted as ports 536(a), 536(b), 536(c), . . . 536(n)) on a multi-port router 535. The multi-port router 535 contains a relay agent 537 for forwarding DHCP packets. The multi-port router 535 connects, via port 536(x), to a network 38. Connected to the network 38 is a manufacturing control server 560 that manages the machines 532 on the assembly line 531. If one of the machines malfunctions, it may be removed and replaced with a standby replacement machine 562. The replacement machine 562 contains a network interface 563, having a unique physical network address 564. The system 531 also contains an enhanced DHCP server 40 and an interface device 42 as in FIG. 1.

Each machine 532 has a network address (for example, an IP address), assigned to it by the enhanced DHCP server 40. In the event that one of the machines 532 is replaced with replacement machine 562, the replacement machine 562 will request a new network address from the enhanced DHCP server 40. A traditional DHCP server would assign the replacement machine 562 a new network address (if available). However, as described above, in connection with FIGS. 1-4, the enhanced DHCP server 40 will not necessarily assign the replacement machine 562 a network address based on its physical network address 564. Rather, the enhanced DHCP server 40 assigns a network address to the replacement machine 562 based on a computed client identity pattern 450 calculated by applying the transformation instruction 212 to the DHCP Discover packet 46 that the replacement machine 562 sends to the enhanced DHCP server 40 in order to request a network address.

The relay agent 537 may add additional data into a DHCP Discover packet 46 before forwarding it on to the enhanced DHCP server. As described in RFC 3046, this additional data is added as Option 82 data at the end of the packet. In one embodiment, this Option 82 data includes the MAC address 574 of the multi-port router 535 as well as the number of the port 536 to which the machine 532 sending the request is connected.

In one embodiment as depicted in FIG. 5, a client may be defined to be a machine 532 of a particular type operating at a particular point along an assembly line 531. Therefore, if a machine e.g., 532(b) is swapped out for a replacement machine 562, the replacement machine 562 and the original machine 532(b) both have the same client identity. Thus, the transformation instruction 212 should be an instruction that preserves this client identity relationship. A proper transformation instruction 212, therefore, might be to concatenate the MAC address 574 of the multi-port router 535, stored in Option 82, with the number of the port 536 to which the machine 532 sending the request is connected, also stored in Option 82. So long as each machine 532 is always plugged into a particular port, this transformation instruction will preserve the client identity relationship. In this embodiment, factory-floor workers need not be trained in computer configuration. If a machine 532 fails, the factory-floor worker may immediately replace it with a replacement machine 562. The factory-floor worker does not need to re-configure the MAC address 564 of the replacement machine 562, nor does the factory-floor worker need to otherwise inform either the enhanced DHCP server 40 or the manufacturing control server 560 of the swap.

On the other hand, if the multi-port router 535 fails and needs to be replaced, the replacement is somewhat more complicated. Such a replacement is likely to be required much less frequently, and typically is done by a trained computer technician. The replacement multi-port router may be re-configured with the MAC address 574 of the original multi-port router 535. Alternatively, the Enhanced DHCP server 40 may be configured to maintain a replacement table, in which the MAC address of a replacement multi-port router is mapped to the MAC address 574 of the original multi-port router. Another solution allows the multi-port router 535 to report a configurable circuit-id, with the Enhanced DHCP server 40 using the reported circuit-id to identify the multi-port router 535. In that case, the circuit-id field might be filled with, for example, the IP address of the router or some other user-configurable string. In any case, the failure of a multi-port router 535 requires configuration of network settings and should be performed by a trained network technician. However, since the failure of a switch serving dozens of complex machines 532 is likely to be much less frequent than the failure of a machine 532, this requirement is not burdensome.

Thus, embodiments of the present invention provide improved methods for a DHCP server 40 to assign a network address to a device 32 on a network 38. Other embodiments are directed at apparatus 40 for use with these methods.

While various embodiments of the invention have been particularly shown and described, it will be understood by those skilled in the art that various changes in form and details may be made therein without departing from the spirit and scope of the invention as defined by the appended claims.

For example, embodiments have been described as having an interface device 42 connected to a user interface 204 on an enhanced DHCP server 40. However, the interface device 42 need not connect directly to the enhanced DHCP server 40. Instead, the user interface 204 may be controlled remotely over the network 38 by interface devices present on other computers connected to the same network 38.

As an additional example, embodiments have been described as receiving a transformation instruction 44 from a user. However, the transformation instruction 44 need not come from a human user. It may come from any command source. For example, the transformation instruction 44 might be received from an automated configuration manager programmed to operate as an artificial intelligence. The term "command source" is defined to be a user or any other configuration system, such as, for example, an automated configuration manager employing artificial intelligence.

As an additional example, embodiments have been described as operating on DHCP Discover packets. However, other forms of client requests for a network address may also be used. For example, DHCP Request packets may also be used. As another example, various types of BOOTP packets may also be used.

As an additional example, embodiments have been described as assigning any available IP address to a client if the client has not previously been assigned an IP address or if the client's previously assigned IP address is no longer available. However, it should be understood that the enhanced DHCP server 40 is not limited to randomly assigning an IP address in such cases. Rather, the enhanced DHCP server may assign the client an IP address through another algorithm. For example, in such cases, the enhanced DHCP server 40 might assign an IP address that was suggested by the client in the DHCP request. As another example, the enhanced DHCP server might analyze the pattern of allocated IP addresses based on physical location within the network 38 (including, for example, which port 536 the client is attached to) and assign an IP address consistent with that pattern.

What is claimed is:

1. A method comprising:
   receiving a transformation instruction from a command source;
   in response to receiving a request from a client for a network address, applying the transformation instruction to the client request to generate a client identity pattern; and
   assigning a network address from a pool of network addresses to the client based on the client identity pattern.

2. A method as in claim 1:
   wherein the request from the client is a Dynamic Host Configuration Protocol (DHCP) packet received over a network;
   wherein applying the transformation instruction to the client request to generate a client identity pattern comprises reading the contents of the DHCP packet and transforming the contents of the DHCP packet by applying the transformation instruction to the contents of the DHCP packet, the output of the transformation being the client identity pattern, the contents of the DHCP packet remaining unchanged by the application of the transformation; and
   wherein the network address is an IP address.

3. A method as in claim 2:
   wherein receiving a transformation instruction from a command source comprises receiving an executable expression from the command source; and
   wherein transforming the contents of the DHCP packet by applying the transformation instruction to the contents of the DHCP packet comprises executing the executable expression on the DHCP packet.

4. A method as in claim 2:
   wherein the DHCP packet includes information stored in fields;
   wherein the transformation instruction identifies a series of fields to be extracted from the DHCP packet and a function on the contents of the series of fields; and
   wherein transforming the contents of the DHCP packet by applying the transformation instruction to the contents of the DHCP packet comprises executing the function on the contents of the series of fields within the DHCP packet to form the client identity pattern.

5. A method as in claim 4 wherein the function is to concatenate the contents of the fields in the order presented.

6. A method as in claim 1:
wherein the client is a first Dynamic Host Configuration Protocol (DHCP) client device;
wherein the request from the client is a DHCP packet received over a network; and
wherein the method further comprises:
after the first DHCP client device has operated for an amount of time using the assigned network address, receiving another client request for a network address from a second DHCP client device that has replaced the first DHCP client device;
in response to receiving the other client request, applying the transformation instruction to the other client request to generate a second client identity pattern, the second client identity pattern being identical to the first client identity pattern; and
assigning the network address to the other DHCP client device based on the second client identity pattern.

7. A method as in claim 1 wherein:
the client is a first machine of a plurality of machines coupled to a multi-port router, the plurality of machines comprising an assembly line, the multi-port router having a plurality of network ports;
each of the plurality of machines couples to the multi-port router by plugging into a network port of the plurality of network ports of the router;
the request from the client is a Dynamic Host Configuration Protocol (DHCP) Discover packet having a field inserted by a relay agent of the multi-port router, the field including an identification of the multi-port router and an indication of which network port the client is plugged into;
applying the transformation instruction to the client request includes concatenating the identification of the multi-port router and the indication of which network port the client is plugged into; and
assigning the network address from the pool of network addresses to the client based on the client identity pattern includes assigning the network address of a machine of the assembly line expected to be plugged into the multi-port router at the network port which the client is plugged into.

8. An apparatus comprising:
a user interface configured to receive a transformation instruction from a user;
a network interface configured to receive a request from a client for a network address;
logic configured to:
in response to receiving a request from a client for a network address, apply the transformation instruction to the client request to generate a client identity pattern, the application of the transformation instruction to the client request not modifying the client request; and
assign a network address from a pool of network addresses to the client based on the client identity pattern.

9. An apparatus as in claim 8:
wherein the request from the client is a Dynamic Host Configuration Protocol (DHCP) packet received over a network;
wherein the logic configured to apply the transformation instruction to the client request to generate a client identity pattern comprises logic configured to read the contents of the DHCP packet and transform the contents of the DHCP packet by applying the transformation instruction to the contents of the DHCP packet, the output of the transformation being the client identity pattern, the contents of the DHCP packet remaining unchanged by the application of the transformation; and
wherein the network address is an IP address.

10. An apparatus as in claim 9:
wherein the user interface configured to receive a transformation instruction from a user is configured to receive an executable expression from the user; and
wherein the logic configured to transform the contents of the DHCP packet by applying the transformation instruction to the contents of the DHCP packet comprises logic configured to execute the executable expression on the DHCP packet.

11. An apparatus as in claim 9
wherein the DHCP packet includes information stored in fields; and
wherein the transformation instruction identifies a series of fields to be extracted from the DHCP packet and a function on the contents of the series of fields; and
wherein the logic configured to transform the contents of the DHCP packet by applying the transformation instruction to the contents of the DHCP packet comprises logic configured to execute the function on the contents of the series of fields within the DHCP packet to form the client identity pattern.

12. An apparatus as in claim 11 wherein the function is to concatenate the contents of the fields in the order presented.

13. An apparatus as in claim 8
wherein the client is a first Dynamic Host Configuration Protocol (DHCP) client device;
wherein the request from the client is a DHCP packet received over a network; and
wherein the logic is further configured to:
after the first DHCP client device has operated for an amount of time using the assigned network address, receive another client request for a network address from a second DHCP client device that has replaced the first DHCP client device;
in response to receiving the other client request, apply the transformation instruction to the other client request to generate a second client identity pattern, the second client identity pattern being identical to the first client identity pattern; and
assign the network address to the other DHCP client device based on the second client identity pattern.

14. An apparatus as in claim 8 wherein:
the client is a first machine of a plurality of machines coupled to a multi-port router, the plurality of machines comprising an assembly line, the multi-port router having a plurality of network ports;
each of the plurality of machines couples to the multi-port router by plugging into a network port of the plurality of network ports of the router;
the request from the client is a Dynamic Host Configuration Protocol (DHCP) Discover packet having a field inserted by a relay agent of the multi-port router, the field including an identification of the multi-port router and an indication of which network port the client is plugged into;
the logic configured to apply the transformation instruction to the client request includes logic configured to concatenate the identification of the multi-port router and the indication of which network port the client is plugged into; and
the logic configured to assign the network address from the pool of network addresses to the client based on the client identity pattern includes logic configured to assign the network address of a machine of the assembly line expected to be plugged into the multi-port router at the network port which the client is plugged into.

15. An apparatus comprising:

means for receiving a transformation instruction from a command source;

a network interface configured to receive a request from a client for a network address;

means for:

in response to receiving a request from a client for a network address, applying the transformation instruction to the client request to generate a client identity pattern, the application of the transformation instruction to the client request not modifying the client request; and assigning a network address from a pool of network addresses to the client based on the client identity pattern.

16. An apparatus as in claim 15:

wherein the request from the client is a Dynamic Host Configuration Protocol (DHCP) packet received over a network;

wherein the means for applying the transformation instruction to the client request to generate a client identity pattern comprises means for reading the contents of the DHCP packet and transforming the contents of the DHCP packet by applying the transformation instruction to the contents of the DHCP packet, the output of the transformation being the client identity pattern, the contents of the DHCP packet remaining unchanged by the application of the transformation; and wherein the network address is an IP address.

17. An apparatus as in claim 16:

wherein the means for receiving a transformation instruction from a command source includes means for receiving an executable expression from the command source; and wherein the means for transforming the contents of the DHCP packet by applying the transformation instruction to the contents of the DHCP packet includes means for executing the executable expression on the DHCP packet.

18. An apparatus as in claim 16 wherein the DHCP packet includes information stored in fields; and wherein the transformation instruction identifies a series of fields to be extracted from the DHCP packet and a function on the contents of the series of fields; and wherein the means for transforming the contents of the DHCP packet by applying the transformation instruction to the contents of the DHCP packet includes means for executing the function on the contents of the series of fields within the DHCP packet to form the client identity pattern.

19. An apparatus as in claim 18 wherein the function is to concatenate the contents of the fields in the order presented.

20. An apparatus as in claim 15 wherein the client is a first Dynamic Host Configuration Protocol (DHCP) client device;

wherein the request from the client is a DHCP packet received over a network; and wherein the apparatus further comprises means for:

after the first DHCP client device has operated for an amount of time using the assigned network address, receiving another client request for a network address from a second DHCP client device that has replaced the first DHCP client device;

in response to receiving the other client request, applying the transformation instruction to the other client request to generate a second client identity pattern, the second client identity pattern being identical to the first client identity pattern; and assigning the network address to the other DHCP client device based on the second client identity pattern.

21. An apparatus as in claim 15 wherein:

the client is a first machine of a plurality of machines coupled to a multi-port router, the plurality of machines comprising an assembly line, the multi-port router having a plurality of network ports;

each of the plurality of machines couples to the multi-port router by plugging into a network port of the plurality of network ports of the router;

the request from the client is a Dynamic Host Configuration Protocol (DHCP) Discover packet having a field inserted by a relay agent of the multi-port router, the field including an identification of the multi-port router and an indication of which network port the client is plugged into;

the means for applying the transformation instruction to the client request includes means for concatenating the identification of the multi-port router and the indication of which network port the client is plugged into; and the means for assigning the network address from the pool of network addresses to the client based on the client identity pattern includes means for assigning the network address of a machine of the assembly line expected to be plugged into the multi-port router at the network port which the client is plugged into.

* * * * *